350-314 3R

XR 3,637,925

[redacted] [redacted] TX 350/314

United States [15] 3,637,925

Flory et al. [45] Jan. 25, 1972

[54] SYSTEM AND FILTER FOR ENCODING COLOR IMAGES ONTO BLACK AND WHITE FILM

[72] Inventors: Robert Earl Flory, Princeton; Fred William Spong, Lawrenceville, both of N.J.

[73] Assignee: RCA Corporation

[22] Filed: Sept. 29, 1969

[21] Appl. No.: 861,709

[52] U.S. Cl. ...............178/5.4 ST, 178/DIG. 28, 350/162 SF

[51] Int. Cl. ..........................................................H04m 9/06

[58] Field of Search ..................178/5.4 ST, 7.2 D; 350/316, 350/317, 162 SF

[56] References Cited

UNITED STATES PATENTS

| | | | |
|---|---|---|---|
| 2,922,837 | 1/1960 | Boothroyd et al. | 178/5.4 ST |
| 3,475,549 | 10/1969 | Goldmark et al. | 178/5.2 |

*Primary Examiner*—Robert L. Griffin
*Assistant Examiner*—Donald E. Stout
*Attorney*—Eugene M. Whitacre

[57] ABSTRACT

In a system for encoding color motion picture film onto black and white panchromatic film for subsequent playback and presentation as a color image on a color television picture tube whereby the hue and saturation of the color image is contained as phase and amplitude modulation of a carrier wave derived from scanning of the encoded black and white film, a spatial color encoding filter is provided for encoding a reference carrier wave along with the colored images. The transmissivity to white light of the encoding stripes of the filter varies at a spatial rate which is a multiple, including a submultiple, of the spatial rate or frequency of the encoding stripes. A reference wave is thereby provided having a frequency which is a multiple, or submultiple, as the case may be, of the abovementioned carrier wave. The reference wave is utilized in the playback-decoding process to decode the color carrier wave and retrieve the hue and saturation corresponding to the encoded color film images.

13 Claims, 4 Drawing Figures

3637925
OR IN 358/5

INVENTORS
Robert E. Flory and
Fred W. Spong
BY Eugene M. Whitacre
ATTORNEY

INVENTORS
Robert E. Flory and
Fred W. Spong
BY Eugene M. Whitacre
ATTORNEY

SYSTEM AND FILTER FOR ENCODING COLOR IMAGES ONTO BLACK AND WHITE FILM

BACKGROUND OF THE INVENTION

This invention relates to systems for encoding color motion picture film images onto black and white film for subsequent playback in a color television system.

It is known in the art that color images may be spatially encoded onto a photosensitive surface by using a striped spatial color encoding filter disposed in the optical path between the color image and the photosensitive recording medium. Such an encoding filter may have a repetitive pattern of red, green and blue stripes for encoding these three color components over the surface of the photosensitive medium, which may be black and white film. Subsequently, the encoded black and white film is imaged onto a television camera pickup tube, for example, and scanning of the encoded image produces a color carrier wave having a period corresponding to the width of the trio of red, green and blue stripes, the width of the scanned photosensitive electrode and the scanning rate. The individual colors will be contained as modulation of the carrier wave, the hue being represented by phase modulation and the saturation being represented by amplitude modulation.

In order to retrieve the proper color information, a reference wave must be provided so that the carrier wave can be decoded. The decoding circuit may comprise a synchronous detector.

To enable accurate demodulation of the color carrier wave, a reference carrier wave is generated along with the color carrier wave so that encoding and decoding system nonlinearities will affect both waves similarly. In the past, there have been several approaches for providing such a reference carrier wave along with the encoded color carrier wave. For example, a fourth stripe may be added to the red, green and blue stripe trio, or a grating of alternate transparent and opaque stripes may be superimposed on the color encoding filter such that when scanned the opaque stripes provide a reference wave. One disadvantage of this approach is that the opaque stripes do not themselves encode colored light and, therefore, the transmission efficiency of the system is reduced. Another approach has been to provide reference stripes which pass all colors except one, but this approach requires that the signal added by the reference wave stripes be subtracted from the color signals in the decoding process.

It is an object of this invention to provide an improved color encoding filter which provides a reference wave for decoding the color carrier wave without the disadvantages of the prior art arrangements.

Another object of this invention is to provide an improved encoding system for encoding color motion picture film images onto black and white panchromatic film.

Another object of this invention is to provide an improved system for producing color television video signals from color encoded black and white motion picture film.

In accordance with the invention a striped spatial color encoding filter is provided having a repetitive pattern of parallel encoding stripes of at least two colors for encoding at least first and second colors of light impinging thereon. The transmissivity of the stripes to white light is varied cyclically across the filter at a rate corresponding to a multiple including a submultiple, of the spatial recurrence rate of the repetitive pattern of stripes.

In an encoding system embodying the invention a striped spatial color encoding filter as described above is placed in an optical path of a black and white motion picture film camera for spatially color encoding the colored scene images passing therethrough onto the black and white film. The cyclically varying transmissivity of the encoding stripes amplitude modulates the light passing therethrough such that the modulation is also recorded on the black and white film.

In another embodiment of the invention a system is provided for generating color difference signals for application to a color television picture tube for reproducing in full color a color image which has been encoded on black and white film through the color encoding filter described above. The encoded black and white film is imaged onto a television camera pickup tube. As the image is scanned, a carrier wave, modulated in phase and amplitude by the hue and saturation of the color image and further amplitude modulated by the varying transmissivity of the filter, is produced and is applied to a first band-pass filter for separating the color carrier wave and its sidebands from the composite signal. The carrier wave is also applied to a second band-pass filter for separating the reference wave produced by the varying transmissivity of the color encoding filter from the remainder of the generated signals. The color carrier wave is coupled to first and second detectors. The reference wave is amplified, limited, and multiplied in frequency to form a reference wave of the same frequency as the color carrier wave. The reference wave is coupled to the first detector to decode a first color difference signal. The reference wave is also coupled to a phase shifter and then to the second detector for decoding the second color difference signal.

A more detailed description of the invention is given in the specification and accompanying drawing of which:

DESCRIPTION OF THE INVENTION

Figure 1:
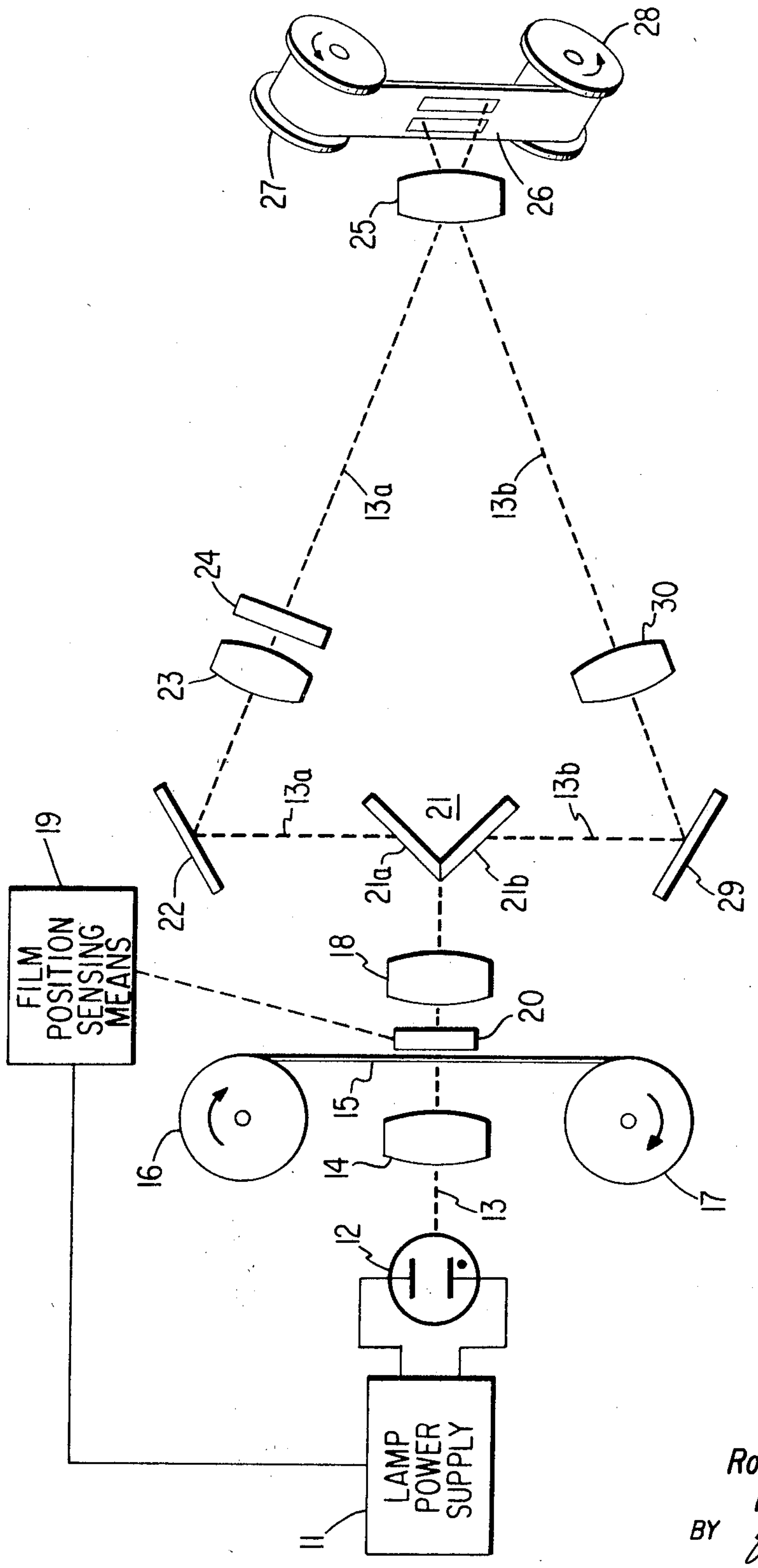
FIG. 1 is a functional diagram of a system for encoding images stored on color motion picture film onto black and white film.

FIG. 1 illustrates a system embodying the invention for encoding images stored on color motion picture film onto black and white film. A lamp power supply 11 provides power for a stroboscopic lamp 12 for illuminating color motion picture film 15. The light from lamp 12 is directed along an optical path 13 and is collimated by a collimating lens 14. Lens 14 directs the light through image bearing frames of color motion picture film 15. Film 15 is unwound from a supply reel 16 and taken up by film reel 17. Colored light from the frames of film 15 is focused by film objective lens 18 onto a mirror assembly 21 comprising mirror portions **21*a* and 21*b*. Mirror portion 21*a* serves to direct light along a first optical path 13*a* to a mirror 22 which directs the light to a relay lens assembly 23 and a color encoding filter 24. Color encoding filter 24 will be described in detail in conjunction with FIG. 3. The light passing through encoding filter 24 is imaged by lens 25 onto a first portion of a frame of black and white film 26. Film 26 is unwound from film reel 27 and is taken up by film reel 28. Black and white film 26 is moved in synchronism with color film 15 such that each single frame of color film 15 is encoded as a separate frame on black and white film 26**.

Film position sensing means 19 is coupled to a conventional shutter assembly 20 to actuate strobe lamp power supply 11 only when each frame of color film 15 is properly located with respect to optical path 13.

Mirror portion **21*b* of mirror assembly 21 directs light along a second optical path 13*b* to a mirror 29. Mirror 29 directs light through a relay lens 30 to lens 25 which in turn focuses the light onto a second portion of film 26. The light directed along optical path 13*b* is used to provide separate image frames on film 26 representative of the brightness of the images on the frames of color motion picture film 15**.

Figure 2:
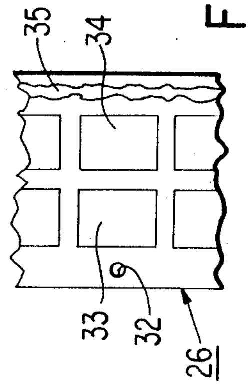
FIG. 2 is a plan view of a portion of the encoded black and white film illustrated generally in FIG. 1.

FIG. 2 illustrates a portion of the encoded black and white film 26 shown in FIG. 1. Film 26 contains successive frames comprising images 33 representative of the brightness of frames of the color film 15 and separate images 34 representative of the encoded color information from corresponding frames of color film 15. Holes 32 are disposed along one side of film 26, adjacent each frame of color and brightness images 34 and 33, for allowing light to pass to a sensing means in the playback system. This sensing means develops a signal which indicates the film is in proper registration for a playback stroboscopic lamp to illuminate the frame. Film 26 may also contain a sound track 35 onto which sound may be recorded in a conventional manner.

Figures 3, 4:
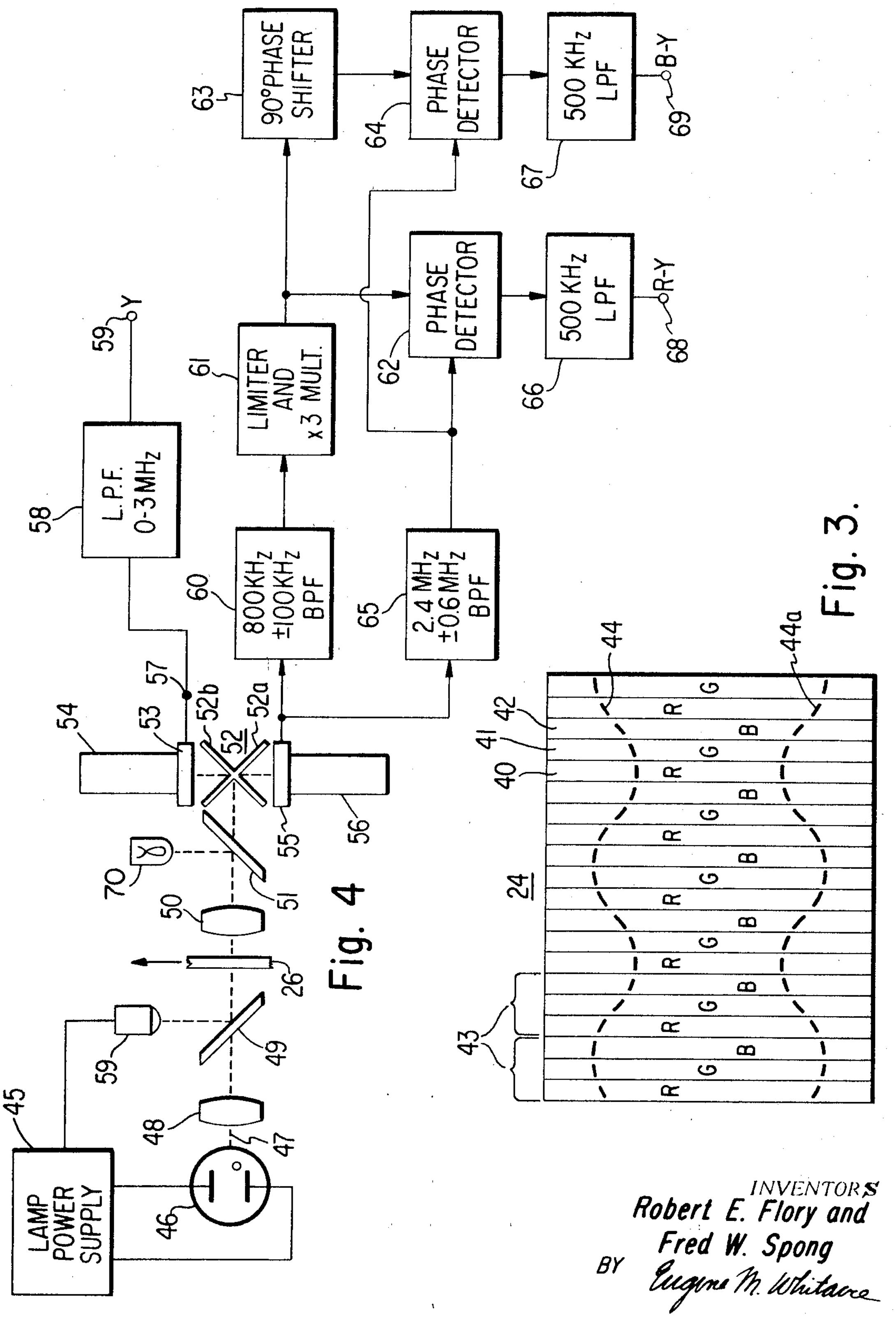
FIG. 3 is a plan view of a color encoding filter shown in FIG. 1.
FIG. 4 is a schematic diagram in block form of a decoding-playback system for the encoded film illustrated in FIG. 2.

FIG. 3 illustrates a color encoding filter 24 which is disposed in the optical path 13*a* of FIG. 1 for encoding colored light onto black and white film 26. Encoding filter 24 comprises a repetitive pattern of stripe portions 43. Each stripe portion 43 contains red (R), green (G), and blue (B) stripes 40, 41 and 42 respectively. For a given fixed line scanning rate in camera tube 56, the width of each repetitive stripe portion 43 determines the period of the carrier frequency produced as the encoding stripe pattern imaged onto a television pickup tube is scanned by an electron beam. An illustrative playback system will be described subsequently in conjunction with FIG. 4.

Red, green and blue stripes 40, 41 and 42 respectively, of filter 24 encode red, green and blue light components of the images stored on color film 15 of FIG. 1. The saturation of the colored light is encoded as amplitude modulation of a carrier wave produced by scanning the image of the stripes and the scene and the hue of the light is encoded as phase modulation of the carrier wave.

As previously mentioned, a reference wave must be provided in order to decode the encoded color information contained in the modulated color carrier wave. Such a reference wave is provided by color encoding filter 24 by means of periodically varying the overall transmissivity of the encoding stripes of filter 24. The varying transmissivity is represented in FIG. 3 by the dotted curves 44 and 44*a*. It can be seen that the envelope defined by the curves 44 and 44*a* varies in a sinusoidal fashion across the surface of filter 24. The varying transmissivity appears as amplitude modulation of the composite signal derived as encoding filter 24 is scanned during playback. A method of constructing an encoding filter having a varying transmissivity for providing a reference carrier wave will be described subsequently.

FIG. 4 illustrates a decoding system for playing back encoded black and white film 26 for providing color difference signals for application to a color television picture tube. A lamp power supply and trigger circuit 45 provides power for a stroboscopic lamp 46 for illuminating encoded black and white film at a television field scanning rate. Light from lamp 46 is directed along an optical path 47 and is collimated by a collimating lens 48. Collimating lens 48 directs the light through a dichroic mirror 49 which passes the light from the strobe lamp 46. This light then illuminates the frames of encoded black and white film 26.

The encoded images of film 26 are directed by a film objective lens 50 through a second dichroic mirror 51 which passes the encoded images onto a mirror assembly 52. Mirror assembly 52 separates the luminance and color encoded images and directs these images to separate pickup tubes in the playback unit. Mirror assembly 52 comprises a first mirror 52*a* which directs the encoded image onto a photosensitive electrode 55 of a television camera pickup tube 56. A second mirror 52*b* directs the luminance or brightness image from film 26 onto a photosensitive electrode 53 of a television camera pickup tube 54. As photosensitive electrode 53 is scanned by an electron beam, an electrical signal corresponding to the brightness of the encoded image is obtained at an output terminal 57. This luminance signal is coupled to a low-pass filter 58 which limits the bandwidth of the luminance signal to 3 MHz. The luminance signal obtained from output terminal 59 of low-pass filter 59 may be applied to a color television receiver or to color television transmitting apparatus.

A lamp 70 emits a continuous colored light, which may be blue, for example, which impinges upon dichroic mirror 51. Mirror 51 reflects the blue light back along the optical path through film objective lens 50 and through black and white encoded film 26. When a frame of film 26 is in proper registration with the camera pickup tube 54 and 56, the blue light will pass through the hole 32 of film 26 as described in conjunction with FIG. 2, and impinges upon dichroic mirror 49. The blue light is reflected by dichroic mirror 49 to a photocell 59 which triggers the lamp power supply 45 and cause stroboscopic lamp 46 to be flashed. This registration system ensures that successive frames of film 26 will be properly imaged onto pickup tubes 54 and 56.

As photosensitive electrode 55 of pickup tube 56 is scanned a composite signal is obtained at its output terminal. The composite signal comprises a suppressed carrier wave modulated in phase and amplitude by the hue and saturation of the colored light, and this signal is amplitude modulated by the varying transmissivity of encoding filter 24 as described in conjunction with FIG. 3. In the illustrative example, the color carrier wave has a frequency of 2.4 MHz. The composite signal derived from camera tube 58 is coupled to a band-pass filter 65 which passes the 2.4 MHz color carrier and 0.6 MHz sidebands. The color carrier and sidebands are coupled from band-pass filter 65 to phase detectors 62 and 64.

The signal obtained from camera tube 58 is also coupled to band-pass filter 60. Band-pass filter 60 separates the amplitude modulated signal provided by the varying transmissivity of encoding filter 24. This amplitude modulation has a frequency of 800 kHz. which is one-third the frequency of the color carrier. The 800 kHz. signal from band-pass filter 60 is coupled to a limiter and frequency multiplier 61 in which the signal is amplitude limited and multiplied by a factor of three for producing a reference wave having a frequency of 2.4 MHz. By selecting the amplitude modulation to be a submultiple of the color carrier wave the amplitude modulated wave can be multiplied and still retain the proper phase relationship to the carrier wave so that it may be used to unambiguously decode the color carrier wave. The 2.4 MHz reference wave obtained from limiter and multiplier 61 is coupled to phase detector 62 for detecting the phase and amplitude modulation of the color carrier wave in a conventional manner. The reference wave is also coupled to a 90° phase shifter 63, from which it is coupled to a second phase detector 64. The phase shifted reference wave coupled to phase detector 64 decodes the color carrier wave applied to wave detector 64 in a conventional manner.

The decoded signals obtained from phase detectors 62 and 64 are coupled to low-pass filters 66 and 67, respectively, for limiting the band-pass of the color signals for application to a color television picture tube. The decoded color signals are obtained at terminals 68 and 69 of low-pass filter 66 and 67 respectively. These signals are indicated as being R–Y and B–Y color difference signals. It should be noted that by selecting the proper phase of the reference signal the color carrier wave may be decoded in such a manner as to produce difference signals other than R–Y and B–Y if desired.

The encoding filter described in conjunction with FIGS. 1 and 3 may be made utilizing photographic materials and techniques. The frequency of the carrier wave will be determined by the scanning frequency and the stripe widths imaged onto the scanned electrode of the television camera pickup tube. Thus, the encoding filters 24 of FIG. 1 may be made in any convenient size, and its image may be optically reduced for forming the desired image size on the black and white film 26 of FIG. 1. For example, the encoding filter of FIG. 3 may have a 4-inch width and a 3-inch height. In order to yield a 2.4 MHz color carrier when imaged onto a ½-inch wide photoconductor, each of the red, green and blue stripes is made approximately 10 mils wide. To make an array of red, green and blue stripes a mask is made having a series of transparent stripes 10 mils wide by 3 inches long on 30-mil centers. The mask is placed over a piece of unexposed color film in a darkroom. A flood exposure is made over the entire surface of the mask-film combination through a red filter, then the mask is moved relative to the color film by 10 mils and a second exposure is made with green light. Another 10-mil movement is followed by a blue light exposure. Development of the color film produces a filter having a pattern of red, green and blue stripes over its entire area. Trial exposures may be made on this same type of color film to determine the proper exposure for each of the colors such that the color stripes transmit equally for white light. This procedure results in the correct data for a balanced stripe filter. It is then necessary to add the reference wave information to the encoding filter.

In the case of the 2.4 MHz color carrier, it is desirable to amplitude modulate the transmissivity of the red, green and blue stripes at a 800 kHz. frequency. Eight hundred kHz. is selected because it may subsequently be multiplied by a factor of three for producing a reference carrier of the proper frequency and phase to demodulate the color carrier wave. Also, the 800 kHz. modulation frequency is outside of the 500 kHz. bandwidth of color information so that the 800 kHz. wave will not be present in the color signal. It is obvious that other combinations of color carrier and reference wave frequencies may be selected to meet a particular design requirement.

To minimize the generation of harmonics a smooth fundamental 800 kHz. filter transmission modulation is desired. To achieve this a mask is made having an opening one-eighteenth of the 800 kHz. reference wave pitch. Each exposure through this mask makes one-half of an individual color stripe, the period of a red, green and blue stripe trio being one-third the period of the 800 kHz. modulation. Utilizing the exposure data obtained from the test filter described above, the exposures through the mask having an opening one-eighteenth of the 800 kHz. pitch are modified by the modulation function $(1+0.6 \cos \theta)^{1.2}$ in which $\theta$ is in increments of 360°18°, or 20° for yielding an 800 kHz. reference wave. The exponent 1.2 is selected to match the average gamma of the color film computed from white light exposure data. The 0.6 coefficient was found to result in a reasonable balance between the recovered 800 kHz. reference wave and spurious effects of this 800 kHz. modulation on the 2.4 MHz. color carrier wave.

In the described embodiment a red, green and blue stripe encoding filter was described. It should be noted that a reference wave generating amplitude modulation may be incorporated in a similar manner on other types of stripe encoding filters. For example, a filter utilizing cyan, magenta and yellow stripes may have its transmissivity varied in accordance with the invention for producing a reference wave having the desired frequency.

What is claimed is:

1. A striped spatial color encoding optical filter comprising:

a plurality of repetitive patterns of different colored stripes for respectively spatially encoding a plurality of colors;

the transmissivity of at least one of said colored stripes to white light being cyclically varied between successive occurrences of at least one of said colored stripes in the repetitive patterns which include said colored stripes, at a repetitive rate which is a multiple, including a submultiple, of the repetitive rate of said colored stripes for producing a reference wave when an image of said stripes is scanned.

2. A spatial color encoding filter according to claim 1 wherein said filter comprises color-sensitive film having said stripes formed thereon by exposing said film through a mask to different colored light for forming said repetitive pattern of different colored stripes.

3. A spatial color encoding filter according to claim 1 wherein said stripes are selected for encoding red, green and blue light.

4. A spatial color encoding filter according to claim 3 wherein said stripes are of equal width.

5. A spatial color encoding filter according to claim 4 wherein said transmissivity of said stripes is varied at a rate having a pitch substantially equal to three times the pitch of said color carrier wave.

6. In a system for encoding image-bearing frames of a color motion picture film onto panchromatic black and white film to form monochromatic images representative of the color motion picture images, apparatus comprising:

means for illuminating said color motion picture film and directing colored light from said color film along an optical path to a panchromatic black and white film for recording monochromatic images representative of the images of said color film; and a spatial color encoding filter disposed in said optical path between said color film and said black and white film, said filter having a plurality of repetitive patterns of different colored stripes for respectively spatially encoding said colored light, the transmissivity of at least one of said colored stripes to white light being cyclically varied between successive occurrences of at least one of said colored stripes in the repetitive patterns which include said colored stripes, at a repetitive rate which is a multiple, including a submultiple, of the repetitive rate of said colored stripes for producing a reference wave when an image of said stripes is scanned.

7. A color encoding system according to claim 6 wherein means are provided for directing light from said color film along a first optical path to means including said color encoding filter for imaging said encoded image on a first portion of a frame of said black and white film, and along a second optical path for imaging said colored light on a second portion of said frame of said black and white film separate from said first portion for forming a brightness representative image of said color film image.

8. A color encoding system according to claim 7 wherein said brightness images and said color encoded images are encoded in fixed relationship to film registration indicia contained alongside each frame on said black and white film.

9. In a system for producing color television video signals from monochromatic motion picture film containing successive frames of color representative images encoded on said monochromatic film by a striped spatial color encoding filter having a plurality of different color encoding stripes at least all of one color having a transmissivity for white light which varies cyclically between successive occurrences of said colored stripes in the repetitive pattern which comprises said colored stripes at a repetition rate which is a multiple, including a submultiple, of the repetition rate of said stripes;

a light source;

means for directing light from said source through said color representative images to an image pickup device;

means coupled to said image pickup device for deriving a color carrier wave of a frequency related to the repetition rate of said stripes;

means coupled to said image pickup device for deriving a reference wave of a frequency related to the repetition rate of said cyclical variation of the transmissivity of said at least one of said stripes to white light; and detecting means coupled to said means for deriving said color carrier wave and to said means for deriving said reference wave for producing first and second detected color representative signals.

10. A system for producing color television video signals from encoded monochromatic film according to claim 9 wherein means are included for passing light through film registration indicia contained on each frame of said monochromatic film to be received by means responsive to said light for developing a signal when said frames are in proper registration with the photosensitive electrode of said image pickup device for triggering said light source.

11. A system for producing color television video signals from encoded monochromatic film according to claim 10 wherein said means coupled to said image pickup device for deriving said color carrier wave and said reference wave includes:

first band-pass filter means for passing said color carrier wave and its sidebands;

second band-pass filter means for passing said reference wave;

means for multiplying said reference wave for producing a second reference wave having the same frequency as said color carrier wave;

means coupling said second reference wave to a first of said detecting means;

means for shifting the phase of said second reference wave; and means coupling said phase shifted second reference wave to a second of said detecting means;

whereby said first and second detecting means provide first and second decoded color representative video signals.

12. A system for producing color television video signals from encoded monochromatic film according to claim 11 wherein said multiplying means multiply said reference wave by a factor of 3.

13. A system for producing color television video signals from encoded monochromatic film according to claim 12 wherein said first and second detectors are synchronous detectors.

* * * * *

UNITED STATES PATENT OFFICE
CERTIFICATE OF CORRECTION

Patent No. 3,637,925 Dated January 25, 1972

Inventor(s) Robert Earl Flory et al.

It is certified that error appears in the above-identified patent and that said Letters Patent are hereby corrected as shown below:

Column 5, line 30, "360°18°" should read -- 360°/18, --.

Signed and sealed this 21st day of November 1972.

(SEAL)
Attest:

EDWARD M.FLETCHER,JR.
Attesting Officer

ROBERT GOTTSCHALK
Commissioner of Patents

)RM PO-1050 (10-69)

USCOMM-DC 60376-P69
☆ U.S. GOVERNMENT PRINTING OFFICE : 1969 O—366-334.